FIG. 1.

FIG. 2.
VARIABLE GAIN NETWORK / GAIN CONTROL

FIG. 3.
D.C. AMP AND FILTER NETWORK

FIG. 4.
AVERAGE CIRCUIT

FIG. 6.
INTEGRATOR CIRCUIT

FIG. 5.
FAST GAIN AMPLIFIER AND OUTPUT CIRCUIT

FIG. 7.

INVENTORS
RICHARD J. BROWN
RICHARD E. ANDEEN
BY
ATTORNEY

INVENTORS
RICHARD J. BROWN
RICHARD E. ANDEEN
BY
ATTORNEY

3,216,676
SELF-ADAPTIVE CONTROL SYSTEM
Richard J. Brown, Clearwater, Fla., and Richard E. Andeen, Phoenix, Ariz., assignors to Sperry Rand Corporation, Great Neck, N.Y., a corporation of Delaware
Filed May 20, 1963, Ser. No. 281,513
13 Claims. (Cl. 244—77)

The present invention relates generally to feedback control systems, and more specifically, to feedback control systems capable of automatically adjusting their own gain to maintain optimum response under widely varying operating conditions, both within the control system itself (component tolerances, aging, etc.) and external to it (environment). Such systems have in recent years been referred to as self-adaptive control systems.

A very good example of a feedback control system to which the principles of our invention may be applied is an aircraft automatic pilot system. In modern jet aircraft as well as re-entry space vehicles, the automatic flight control system must be capable of operating with optimum response not only during very high aerodynamic speeds but also at relatively very low aerodynamic speeds such as those experienced during take-off and landing. Also, it is desirable that such a system be capable of adapting its operation to changes within the system, such as, for example, changes in component tolerances, aging, and the like, and as well with changes in the aerodynamic configuration of the vehicle, for example, variable geometry aerodynamic surfaces. The self-adaptive control system of the present invention will automatically maintain the operation of an autopilot/aircraft feedback control system (over-all control loop) at an optimum under all the foregoing conditions.

A number of self-adaptive control systems have been proposed in the past and with some measure of success. However, in most cases these systems have been limited in their capabilities of self-adaption because of operating characteristics that produce undesirable effects on the control system. Some systems have used auxiliary or test signals which tend to upset the operation of the control system and/or many have required a sustained limit cycle oscillation of the control system to sense the need for adaption and/or many tend to become confused when repeated commands are introduced into the control system. The self-adaptive control system of the present invention achieves complete optimization of the autopilot/aircraft feedback control system without the above-mentioned undesirable effects; the criterion used for adaptation is the maintenance of a desired balance between the error energy associated with the low and high frequency dynamics of the control system as reflected in the frequency spectrum of the system error; for example, the maintenance of a desired balance between the error energy associated with vehicle dynamics and that associated with autopilot induced dynamics.

It is therefore a primary object of the present invention to provide a self-adaptive feedback control system in which the system gain is adjusted so as to maintain a desired balance between the low and high frequency energies contained in the system error, viz., an energy-balance self-adaptive control system.

As stated, the principles of our invention are set forth herein in connection with an automatic flight control system for aircraft having a very wide range of operating conditions; from very low speeds and/or altitudes to very high speeds and/or altitudes. Such a flight control system in general includes some means for detecting motions of the aircraft about one or more of its primary axes and for supplying an error signal in accordance therewith, a signal responsive means including means for controlling or producing motions of the aircraft about said axes, and a variable gain means coupling the error signal with the signal responsive means for controlling the latter in a manner which tends to maintain the error signal minimum or zero. The self-adaptive control of the present invention receives the signal representing the system error, analyzes its frequency spectrum at least over the frequency response range of the system, derives a measure of the difference between the low frequency energy and the high frequency energy contained therein, and then adjusts the gain of the system variable gain means in a direction and to an amount to tend to maintain the energy difference zero through operation of the signal responsive means in controlling craft motion and in turn reflecting back into the system error signal.

It is therefore another object of the present invention to provide a self-adaptive feedback control system in which the frequency spectrum of the system error in analyzed, in which separate measures of the low and the high frequency energies therein contained are derived, and in which a system gain control signal is provided for controlling the system gain in a direction and an amount which tends to reduce the difference between the separate energy measures to zero.

As set forth in the foregoing, the self-adaptive technique employed in the present invention is based on the energy content of the system error over the frequency spectrum of the system response characteristics, and more specifically on the difference between the energy content of the low and high frequencies thereof. Therefore, since the energy content of the system is based on both the frequency and amplitude thereof, it is important that no saturation of the frequency analysis circuits occurs, that is, for a given design of the frequency analysis circuits, the amplitude of the system error input must be adjusted so as not to saturate these circuits. This is accomplished by sensing the amplitude of the output of one of the frequency analysis circuits and through a degenerative feedback connection adjusting the gain of the input to both frequency analysis circuits to maintain the amplitude of the input within design limits. Such technique may be employed without impairing the performance of the adaptive computer because its output is based on the difference or ratio between the low and high frequency energy content of the error so that varying the gain of the system error does not affect the ratio. In the illustrated embodiment of our invention wherein the adaptive control is applied to an aircraft autopilot system, the amplitudes of the high frequency components of the system error tend to be greater than the amplitude of low frequency components so that the feedback signal is derived from the high frequency energy channel. This gain control feedback also serves another very important function in that it maintains the computer's speed of response substantially the same for both large and small system error inputs.

Furthermore, in many feedback control systems the desirable balance between the low and high frequency energy content of the error which the self-adaptive system operates to achieve is a function of the operating condition of the system. In systems of the type disclosed herein, the energy contained in the high frequency portion of the system error spectrum is substantially reduced at low speed flight conditions. Unless this effect is compensated for, the gain of the system would be set at a value higher than optimum because of the overbalancing capabilities of the low frequency energy. Since at low speed flight conditions the self-adaptive system tends to establish a high system gain, this effect is conveniently compensated for by a further feedback connection responsive to the existing system gain setting, and adapted to increase the gain of the high frequency energy deriving circuit and/or to decrease the gain of the low frequency energy deriving circuit. This feedback connection also serves in effect to shift the self-adaptive system's null frequency, i.e. the frequency about which the high and low frequency energies are balanced.

It is therefore a further object of the present invention to provide an adaptive computer for a feedback control system which is adapted to change the system gain in accordance with the difference between the high and low frequency energy contained in the system error and which adaptive computer can adapt itself (an adaptive computer within an adaptive computer) to the changing operation conditions of the over-all system.

Still another feature of the present invention resides in the capability of the adaptive computer to adjust the system gain more rapidly in one direction than in the other. This capability is very desirable because in many applications when the system gain is set at its optimum high point it is essential to reduce the gain almost instantly upon a change in operating conditions in which, with the gain set at its optimum high point, a high frequency instability occurs. On the other hand, it is desirable to approach an optimum high gain slowly because of the usually critical nature of such a gain setting.

It is therefore a further object of the present invention to provide an adaptive computer of the foregoing character in which the system gain is varied in one direction more rapidly than in the opposite direction.

Other objects and advantages of the system of the present invention will become apparent as a description of a preferred embodiment thereof proceeds, reference being made therein to the accompanying drawings wherein:

As mentioned in the foregoing, self-adaptive control systems have been previously proposed with various measures of success. One type of system is that in which a continuous locally generated high frequency auxiliary or test signal is inserted into the system to induce a motion of the system controller, the gain setting being determined by the system response to this signal. Another type is one which increases system gain to the point of oscillation, detects controller motion as a result of this oscillation and adjusts gain to a value which results in a controlled low amplitude limit cycle. Still another type looks at the system error signal but only a relatively narrow band of the high frequency portion thereof and adjusts the system gain to control the frequency at which the peak energy transmission occurs.

Each of the above-mentioned types of systems is limited in capability for self-adaptation because of operating characteristics that produce undesirable effects on the control system. The type of system in which a continuous locally generated high frequency auxiliary or test signal is inserted into the system has a tendency to upset the normal operation of the system. One of the advantages of the system of our invention is that it does not use a test signal. The type of system which increases system gain to the point of oscillation and adjusts gain to a value which results in a controlled low amplitude limit cycle possesses at least two disadvantages. The first is that the sustained limit cycle which is essential to its operation may be objectionable. Our invention does not require a limit cycle for its operation. The second disadvantage is that repeated commands into the system tend to confuse the system by exciting the limit cycle oscillation to a higher amplitude than normal which the self-adaptive system interprets as a requirement to reduce system gain, this occurring at a particularly inopportune time because the reduced gain decreases the ability of the system to respond properly to such repeated commands. In our invention, because the gain setting of the system is determined by the balance between the energy detected in a broad band of low frequencies and that detected in a broad band of high frequencies, this reduction in system gain does not occur, because the repeated commands increase the energies detected in both the low frequency band and the high frequency band. In fact, since commands have a tendency to excite the low frequencies more than the high frequencies, a slight increase in gain usually occurs which permits the system to respond better to the commands. The type of system which looks at the system error signal but only a relatively narrow band of the high frequency portion thereof and adjusts the system gain to control the frequency at which the peak energy transmission occurs may lose its self-adaptive capability if the frequency of the peak energy transmission shifts due to a change in the dynamics of an element of the system, for example a change in actuator controller dynamics, and this shift in frequency is sufficient to place the frequency of peak energy transmission outside the range of the filters which detect the frequency of the peak energy transmission. Furthermore, in the relatively narrow portion of the high frequencies within which the peak energy transmission occurs, for proper operation of the self-adaptive system, the frequency of the peak energy transmission must increase as the system gain is increased. The self-adaptive system of our invention, since it detects a relatively broad band of high frequencies, is not affected by a shift in the frequency of the peak energy transmission which would be sufficient to affect the operation of the other type of system, and furthermore, it is inconsequential to our system whether the frequency of the peak energy transmission increases or decreases with system gain.

A further type of self-adaptive system of which we are aware has been proposed by E. G. C. Burt in an article in "VDE, VDT Conference on Automatic Control," Heidelberg, Germany, September 1956, entitled "Self-Optimising Systems." This system is self-adaptive in the sense that it adjusts the parameters of a control system that has noise associated with the input to minimize the mean square error due to the noise. In a particular form of system, the self-optimizing feature will compensate only for changes in the mean value of the input signal (or noise). Burt is thus interested only with a filtering problem, and does not include problems associated with control of a dynamic system, which is the entire purpose of the present invention. In the example Burt presents in his article he is concerned with the special case where the input to the control system consists of a true input with a spectral density that decreases as the fourth power of the frequency, and noise of constant spectral density (white noise). In principle, Burt determines whether the sign of the ratio of the change in the mean square of the error to change in system gain is positive or negative by determining the sign of its equivalent, the ratio of the change in the spectral density of the apparent error to the change in frequency. This may be thought of simply as determining the slope of the error spectral-density vs. frequency curve and controlling system gain to maintain the slope zero. Burt accomplishes this by measuring the value of the mean square of the system error at two different points along the frequency axis of the spectral density vs. frequency curve through the use of two tuned, frequency spaced, band-pass filters having similar amplitude characteristics and subtracting these measured values. Thus, the only criteria required by Burt is that the filters be spaced frequency-wise and have similar amplitude attenuation characteristics. However, it is important to note at least two major limiting characteristics of Burt's system which limit its application and prevents it from solving the problems associated with the control of a dynamic system such as disclosed herein: (a) the self-optimizing system is responsive to changes in the mean square level of the signal (or noise), but not to changes in the dynamics of the elements of the control system and (b) the spectral density vs. frequency curve is assumed to be monotonically increasing or decreasing, and therefore the system does not account for system resonances.

The self-adaptive system of our invention is superior to those briefly set forth above because the proper gain setting of the system is based on a considerably greater amount of information. In the present adaptive computer the entire frequency spectrum of the response characteristics of the system is examined and the optimum system gain setting is determined on the basis of an energy balance relationship between normal control motions associated with both short and long period system dynamics and those associated with control system induced modes; in the illustrative example, with control motions associated with short and long period vehicle motions and those associated with automatic pilot induced modes. In effect, by looking at such a very wide band of frequencies, the self-adaptive system of the present invention is more sensitive to small changes in performance because the small effects occurring at individual frequencies are integrated over the whole band of frequencies considered. Also, by looking at the full frequency spectrum, the adaptive computer is less sensitive to changes in the particular frequencies at which the major aircraft/autopilot loop resonances occur. Furthermore, since the adaptive computer operates on a balance, or ratio, of low and high frequency energies, the gain established thereby is substantially independent of the amplitudes of external disturbances or pilot-induced commands which the aircraft experiences.

In order clearly to understand the principles of the present invention, reference is made to the known principle of minimizing the mean-squared value of the system error (MSE) which is equivalent to minimizing the total energy associated with all frequencies existing in the system error to its lowest value. This may be expressed, in the frequency domain, by the following relation:

$$MSE = \frac{1}{\pi}\int_0^\infty \Phi_e(\omega)d\omega \quad (1)$$

where $\Phi_e$ is the power spectral density function of the system error $e$ and $(\omega)$ indicates the frequency domain.

A disadvantage of using minimum MSE as the only gain control criterion is that it often results in a resonance condition because the gain K of the system variable gain element is set too high in order to reduce the energies at some frequencies at the expense of an energy peaking at one or more other frequencies. This is shown graphically in FIG. 7 wherein the area (representative of error energy) under the curve $K_3$ is minimum but includes an undesirable high frequency peak.

Figure 7:
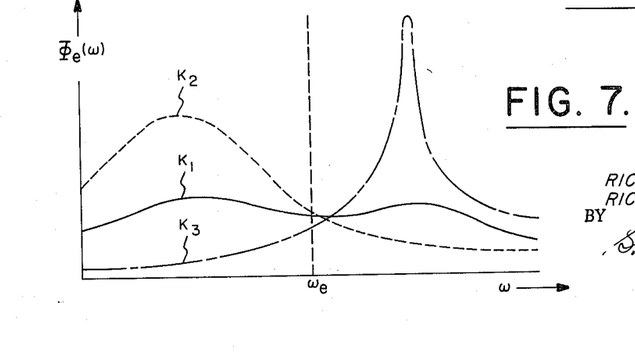
FIGS. 7 through 17 are a series of graphs which will aid in understanding the principles on which our invention is based.

Now the error minimization procedure, in accordance with the teachings of the present invention, overcomes this inherent disadvantage by requiring that the MSE be minimized only to the extent that system resonances do not occur, that is the energies associated with resonances are weighted more heavily than those which do not indicate resonance. This is accomplished by minimizing a moment function M of the power spectral density. As shown in FIG. 7, this is accomplished by minimizing the moment M of the $\Phi_e(\omega)$ vs. $\omega$ curve about the $\omega$ axis rather than simply the area under the curve. Therefore, considering an incremental moment contributed by an incremental area, $dM = (\frac{1}{2}\Phi_e)(\Phi_e dw)$, we can accomplish the above by minimizing the following integral:

$$M = \frac{1}{2\pi}\int_0^\infty \Phi_e^2(\omega)d\omega \quad (2)$$

This results in giving more weight to elements of area under resonant peaks in the $\Phi_e(\omega)$ vs. $\omega$ curve while at the same time tending to minimize the total area or MSE associated with system operation. The graphic results are shown by the curve $K_1$ in FIG. 7, wherein a balance in system error energy is evident.

In order to determine the minimum of the moment function M, we take its derivative with K:

$$\frac{dM}{dK} = \frac{1}{\pi}\int_0^\infty \Phi_e \frac{d\Phi_e}{dK}d\omega \quad (3)$$

which may be written in the following equivalent forms:

$$\frac{dM}{dK} = \frac{1}{\pi}\int_0^{\omega_0}\Phi_e\frac{d\Phi_e}{dK}d\omega + \frac{1}{\pi}\int_{\omega_0}^\infty \frac{d\Phi_e}{dK}d\omega \quad (4)$$

$$\frac{dM}{dK} = -C_L(MSE)_L + C_H(MSE)_H \quad (5)$$

$$\frac{dM}{dK} = -EB \quad (6)$$

where $\omega_c$ is the approximate frequency where $$\frac{d\Phi_e}{dK}$$

changes sign, $-C_L$ is proportional to the value of $$\frac{d\Phi_e}{dK}$$

in the frequency band from 0 to $\omega_c$ where this function is negative, $C_H$ is proportional to the value of $$\frac{d\Phi_e}{dK}$$

in the frequency band from $\omega_c$ to $\infty$ where this function is positive, $(MSE)_L$ is the total energy in the frequency band from 0 to $\omega_c$, $(MSE)_H$ is the total energy in the frequency band from $\omega_c$ to $\infty$, and EB is the Energy Balance. It should be noted that in the event the system error spectrum has more than two resonant peaks as illustrated above, then the moment minimization would include additional terms in Equations 4 and 5 corresponding to each additional resonant peak and including that portion of the error spectrum associated with the resonance. It should also be noted that $C_L$ and $C_H$ are assumed to be a function of K only. It is through this approximation that the energy balance computer of our invention becomes a practical system. It is justified in a practical application because even though $C_L$ and $C_H$ are also a function of frequency, the frequency regions which have the greatest contribution to the summation of Equation 4 are relatively constant; that is, at the peaks (where $\Phi_e$ is greatest).

In order to minimize the moment M, $$\frac{dM}{dK} = -EB$$

must be reduced to zero thereby establishing the criterion for the optimum system gain K:

$$\frac{dM}{dK} = -EB = -C_L(MSE)_L + C_H(MSE)_H = 0 \quad (7)$$

This equation defines the relationship between the low and high frequency energies and the energy balance EB and indicates which direction and to what extent K must be adjusted to achieve the optimum. Thus, if EB is positive, $dM/dK$ is negative and K should be increased to reduce M; if EB is negative $dM/dK$ is positive and K should be reduced to reduce M; if EB is zero, $dM/dK$ is zero and the minimum of M is achieved. We may now write the expression for energy balance adaptive computer of our invention:

$$K = f(k_f EB + k_s \int EB \, dt) \quad (8)$$

where $k_f$ gives the system a fast gain change characteristic and $k_s$ a slow gain change characteristic as will be described below.

Figure 1:
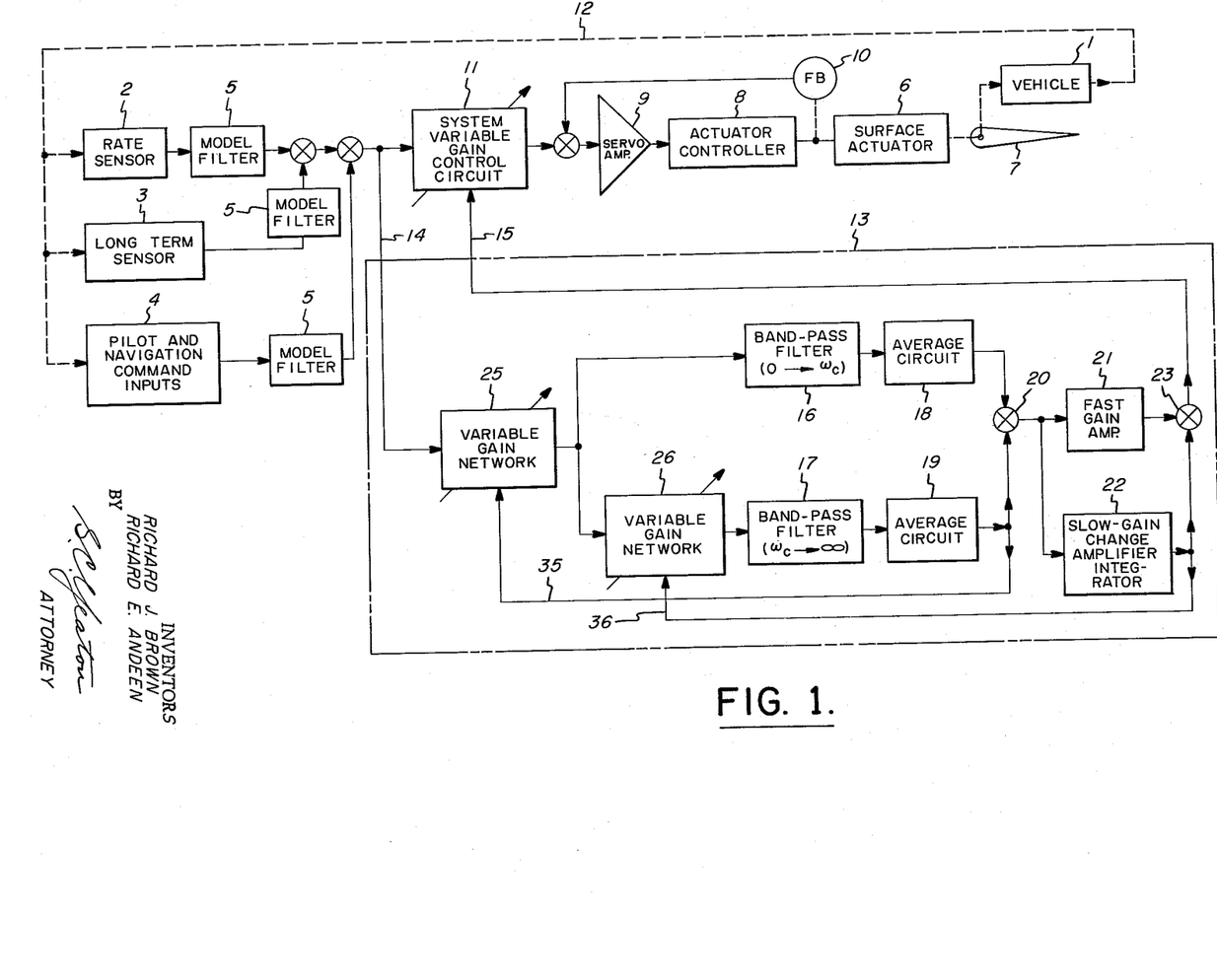
FIG. 1 is a block diagram of a feedback control system, specifically an automatic pilot for an aircraft, incorporating the teachings of our invention.

The illustrative self-adaptive system considered herein is shown in FIG. 1 and specifically may be considered as the pitch channel of an automatic pilot system controlling the elevator of, and hence, the motions of an aircraft about its pitch axis. The system comprises generally the vehicle or airframe 1 controlled by an autopilot which includes a conventional rate sensor 2, such as a pitch rate gyro, long term sensor 3, such as a gyroscopic vertical reference, a command input 4, such as a pilot manual input and/or a navigation control input, all of the above mentioned applied to the autopilot through model filter networks 5; a system controller which in this example may include a hydraulic actuator or servo motor 6 for positioning the craft elevator 7 through an actuator controller 8, servo amplifier 9 and surface position feedback or minor loop or autopilot feedback connection 10. All of the foregoing being conventional elements so familiar to those skilled in the art as to require no detailed illustration or discussion. Finally, a system variable gain control circuit 11 is provided which couples the combined system sensor outputs with the system controller.

Movement of the system controller, the craft elevator 7, results in a motion of the aircraft or vehicle, which motion in turn is sensed by the system sensors 2, 3 and 4, this effect being illustrated by the dotted connection 12 and therefore is the system or major loop feedback connection. As stated, the foregoing elements constitute a conventional aircraft/autopilot feedback control system.

The self-adaptive computer 13 of the present invention has its input 14 connected to receive the system error and its output 15 connected to control the system variable gain control circuit 11 of the control system. It comprises generally a first frequency responsive circuit 16, i.e. a band-pass filter adapted to pass the low frequency components of the system error spectrum, and a second frequency responsive circuit 17, i.e. a band-pass filter adapted to pass the high frequency components of the system error spectrum; averaging circuits 18 and 19 for the low and high frequency circuits, respectively and adapted to derive therefrom measures of the low and high frequency energy contained in the error signal; a summing point 20 for the outputs of the averaging circuits 18 and 19 for obtaining their algebraic sum; a fast gain changing amplifier 21; and a slow gain changing amplifier integrator 22; the output of amplifier 21 and integrator 22 being combined at 23 to provide the computer output 15. The fast gain changing amplifier 21 is adapted to respond rapidly to reduce the gain setting for system variable gain network 11 and to increase such gain at a much slower rate, as will be described later. Also, the integrator 22 is adapted to establish an average or steady state value for the system variable gain control 11.

Basically, there are three inputs to the system: (a) turbulence inputs—motions of the craft produced by atmospheric disturbances and sensed primarily by the rate and long term sensors 2 and 3, and (b) command inputs —system inputs produced by the human pilot or navigation subsystems, fire control computers and the like, 4. What may be thought of as a third system input (c) is the sensitivity of the system to the dynamic characteristics of the closed loop system itself. All of these inputs are sensed by the system sensors, such as the rate gyro 2, long term reference 3 and pilot and navigation command inputs 4 with their associated model filters 5, and the output signals supplied thereby are combined to produce a system error signal having a magnitude and frequency characteristics related to these inputs.

The power density spectrum of the system error signal may be expressed as follows:

$$\Phi_e = |H_C|^2 \Phi_I \quad (9)$$

where:

$\Phi_e$ = power density spectrum of the system error signal
$H_C$ = system error signal transfer function (closed loop transfer function including all vehicle and autopilot transfer functions relating system error to command inputs)
$\Phi_I$ = power density spectrum of command inputs and turbulence inputs reflected to command input.

This error signal may be broken down into its low and high frequency power density spectrum components by the frequency sensitive networks 16 and 17 as follows:

$$\Phi_L = |Y_L|^2 |H_C|^2 \Phi_I \quad (10)$$
$$\Phi_H = |Y_H|^2 |H_C|^2 \Phi_I \quad (11)$$

where:

$Y_L$ = transfer function of filter 16
$Y_H$ = transfer function of filter 17

From the foregoing, it may be shown that the total energies in the high and low frequency portions of the error signal may be expressed as $$E_L = \frac{1}{\pi} \int_0^\infty |Y_L|^2 |H_C|^2 \Phi_I \, d\omega \quad (12)$$

$$E_H = \frac{1}{\pi} \int_0^\infty |Y_H|^2 |H_C|^2 \Phi_I \, d\omega \quad (13)$$

These expressions show that the high and low frequency energies contained in the system error signal are sensitive to (1) the response modes of the system through the system error signal transfer function $H_C$ and (2) the character of the turbulence and command inputs through the power density spectrum $\Phi_I$.

In order to clarify the concepts set forth in the foregoing; i.e. establishing a balance between the high and low frequency energies associated with aircraft dynamics and automatic pilot induced dynamic modes, a number of frequency response curves, plotted by using conventional logarithmic techniques, will be referred to. These are illustrated in FIGS. 8 to 17 and are based on the following criteria:

(a) The control system is of the type illustrated in FIG. 1, viz., an aircraft and autopilot controlling the same;

(b) The aircraft is of the re-entry type having pre-determined transfer functions;

(c) Two flight conditions are assumed: (I) high speed; medium altitude representing one phase of re-entry and, (II) extremely slow speed, sea level, representing a late phase of an approach and landing situation;

(d) For illustrative purposes, three different gain settings for each flight condition are chosen: $K_1$-optimum, $K_2 = \frac{1}{2} K_1$ and $K_3 = 2K_1$ these gain settings being based on the assumed transfer functions of the fixed system elements of the aircraft/autopilot system and the power density spectrum of the disturbance and command inputs $\Phi_I$ at the flight conditions mentioned.

Figure 8:
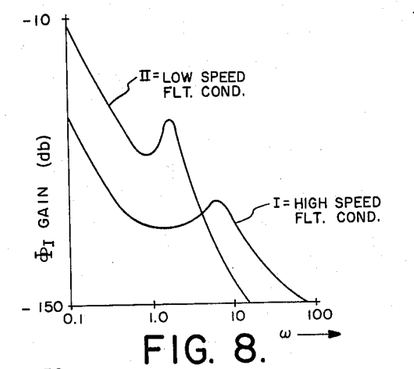

FIG. 8 shows the frequency response curve for the pilot and turbulence inputs $\Phi_I$ as they appear at the command input. It will be noted that the bandwidth is greater for high speeds than for low; the relative amplitudes of the low frequencies are considerably higher for low speeds; and resonances occur, the latter being due to air turbulence exciting motion of the vehicle at its natural frequency.

Figure 9:
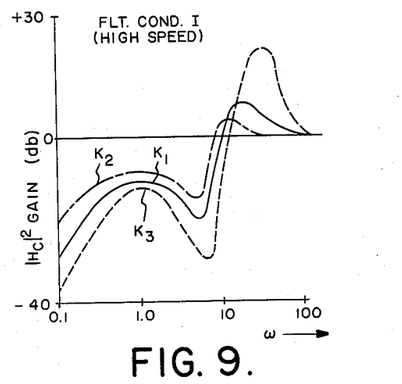
Figure 10:
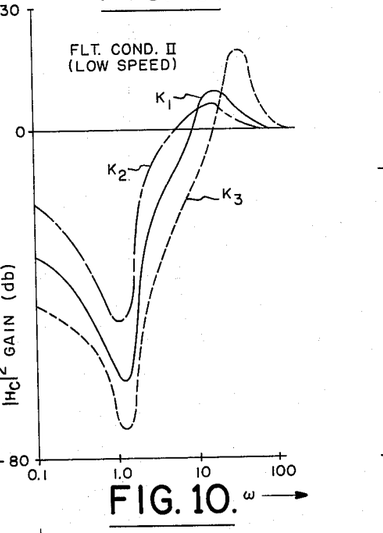

FIGS. 9 and 10 are the frequency response curves for the system error transfer function, $|H_C|^2$, at flight conditions I and II respectively, all gains considered. Here note that at both flight conditions increasing gain reduces the error function at low frequencies. Also, that at very high frequencies, increasing gain has little effect because both the vehicle and autopilot do not respond fast enough at these frequencies. Further, that between 10 and 60 radians per second frequencies, which are associated with the autopilot induced dynamic modes, increased gain causes resonances in the error characteristics and a corresponding increase in the error function.

Figure 11:
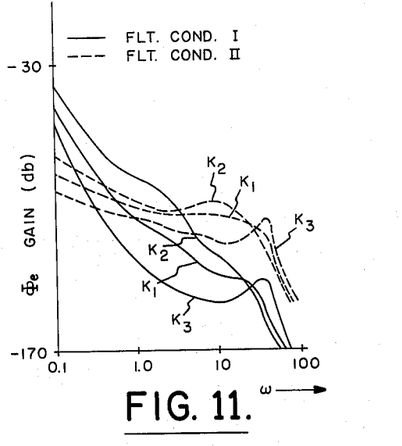

Adding the curves of FIGS. 8, 9 and 10 as required by Equation 9 results in the frequency response curve for $\Phi_e$ shown in FIG. 11. This represents the raw data upon which the self-adaptive computer of the present invention operates. The points to note from these curves are that at each flight condition an off-optimum gain condition causes a corresponding change in the error spectrum which is used to develop the adaptive gain control signal. Also, when the gain is increased from optimum, the low frequency errors (below about 20 rad./sec.) decrease and the high frequency errors (above 20 rad./sec.) increase and when the gain is decreased from optimum, the opposite effects occur. Furthermore, the curves show that in some cases, it may be desired, in order to increase the sensitivity of the system, to pre-filter the error signal to the energy balance computer in order to block the very low frequency errors, e.g. below 1 rad./sec. Also, it may be desirable that the pre-filter likewise block very high frequencies associated with noise which might otherwise adversely affect the operation of the adaptive computer, e.g. above 60 rad./sec. Converting the logarithmic plots of FIG. 11 to amplitude plots for each flight condition, and allowing for the effect of an input very low frequency blocking filter, results in FIGS. 12 and 13. It will be noted that the total area under each curve is a measure of the total energy developed. Thus, between any two given frequencies, the energy output is measured by the area under the curve between these frequencies.

Figure 12:
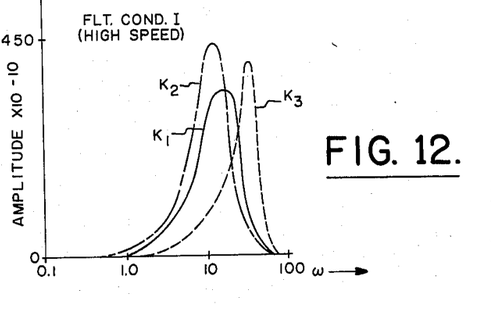
Figure 13:
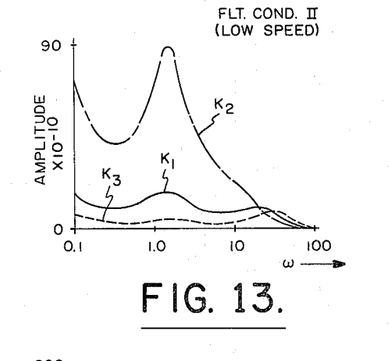
Figure 14:
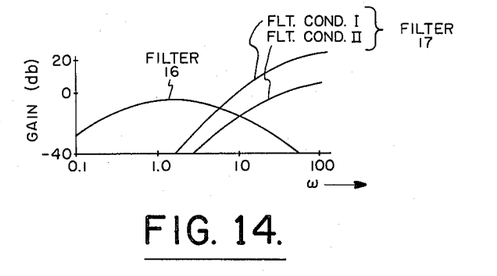

In accordance with the teachings of the present invention, the filters 16 and 17 are so designed that when their characteristics are applied to the low and high frequency curves of FIGS. 12 and 13, they will provide equal areas for the optimum gain condition ($K_1$ curves) and will indicate an unbalance for off-optimum conditions ($K_2$ and $K_3$ curves). A number of filter designs will produce the desired result and one illustrative set of filter characteristics is shown in FIG. 14. It will be noted that filter 16 looks at a wide band of low frequencies while filter 17 looks at a wide band of high frequencies and together they look at the entire frequency spectrum of the system's response characteristic. As mentioned earlier, and in accordance with the objects of the present invention, the gain of the high frequency filter 17 must be varied in order to compensate for the reduced amount of high frequency energy at the low speed flight condition as evidenced by the illustrative ordinate scales of the preceding curves.

Figure 15:
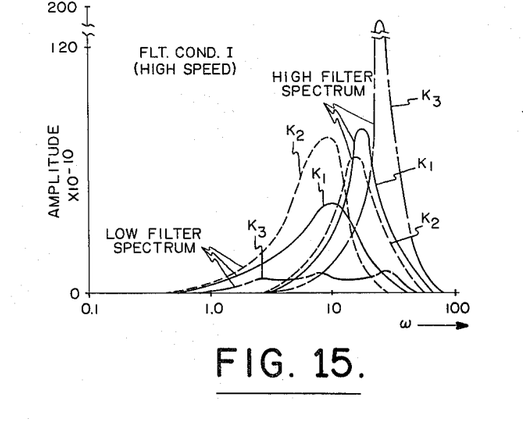
Figure 16:
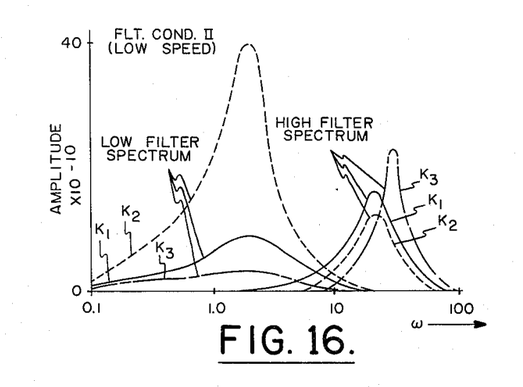

If now the characteristics of filters 16 and 17 shown in FIG. 14 are applied to the system input characteristics shown in FIGS. 12 and 13, the final desired results are obtained, as illustrated in FIGS. 15 and 16. FIG. 15 shows the results for flight condition I and FIG. 16 for flight condition II. Inspection of these figures shows that the areas under the high and low frequency curves for optimum gain setting $K_1$ are equal and since the areas are directly proportional to the respective energies contained in the system error signal, an energy balance is achieved and hence the moment about the $\omega$ axis is minimized. If the gain of the system is too low ($K_2$ curves), the area under the low frequency (low filter spectrum) curves increases and that under the high frequency (high filter spectrum) curves decreases indicating that the system gain should be increased until the areas and, hence, energies between the low and high frequencies are equal or balanced (curves $K_1$). Similarly, if the gain of the system is too high ($K_3$ curves), the area under the low frequency curves decreases and that under the high frequency curves increases indicating that the system gain should be decreased until the areas are again equal (curves $K_1$).

Figure 17:
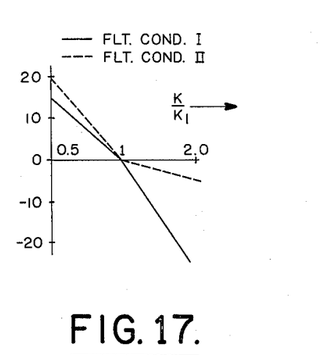

FIG. 17 illustrates a summarization of the results of the foregoing analysis in which the net output at the summation point 20 is determined from FIGS. 15 and 16 and plotted as a function of the ratio between the off-optimum gain setting and the optimum gain setting. This plot shows a non-linear characteristic of the gain control output, viz., non-linear in a direction which results in a fast gain reduction of a high gain condition in the high speed situation and a similar fast gain increase for a low gain condition in the low speed situation.

An apparatus for carrying out the principles of the self-adaptive feedback control system of our invention as set for in the foregoing is illustrated in FIGS. 1 through 6. In FIG. 1 the frequency analysis circuits or energy balance computer 13 is outlined by dot-dash lines. Its input, appearing on lead 14, is the system error signal which may have the characteristic illustrated by any one of the curves of FIGS. 9 and 10 depending upon the instantaneous setting of gain control element 11 and the flight condition, as heretofore explained. The error signal derived from sensors 2, 3 and 4 may be an amplitude modulated 400 cycle signal such as supplied by conventional A.C. signal generators connected with the sensors. This signal is applied to frequency responsive circuits or band-pass filters 16 and 17 through a variable gain network 25 which may include suitable demodulator-amplifier circuits and blocking pre-filters. The error signal applied to the high frequency filter circuit 17 is passed through a further variable gain network 26. These networks and their function will be hereinafter more fully described in connection with the novel feedbacks within the adaptive computer which in effect adapt the adaptive computer more precisely to changing flight conditions.

Figure 3:
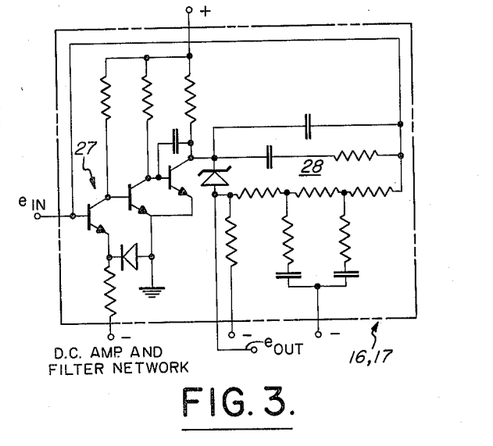
Figure 4:
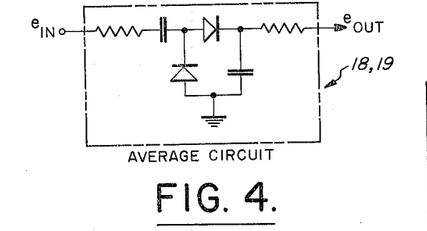

A suitable circuit for use in the frequency responsive filter circuits 16 and 17 is illustrated in detail in FIG. 3, it being understood that the desired band-pass characteristics may be accomplished by suitable selection of the R-C elements thereof. Basically, the filter circuit comprises a D.C. amplifier section 27 and an R-C network section 28. The R-C filter section 28 for the band-pass filter 16 is adapted to pass the low frequency band of the error signal while the band-pass filter 17 is adapted to pass the high frequency band of the error signal. The filter characteristics are illustrated in FIG. 14 for the present embodiment of the invention.

The respective outputs of the band-pass filters circuits 16 and 17 are applied to respective low and high frequency averaging or energy computation circuits 18 and 19, which circuits are adapted to provide measures of the total energy contained in the low and high frequency spectrums passed by the band-pass filters 16 and 17 respectively. From a theoretical standpoint, this circuit should be an auto-correlation or squaring network; however, from a practical standpoint and without deteriorating performance, a simple rectifier-filter circuit such as that shown in FIG. 4 may be employed. The output of the low frequency channel 16, 18 will be a D.C. signal proportional to the total energy contained in the low frequency spectrum of the system error as represented by the area under the low filter spectrum curve $K_1$ of FIGS. 15 and 16 for conditions I and II respectively at the optimum system gain setting. Similarly, the output of the high frequency channel 17, 19 will be a D.C. signal proportional to the total energy contained in the high frequency spectrum of the system error as represented by the area under the high filter curve $K_1$ of FIGS. 15 and 16 for conditions I and II respectively at the optimum system gain setting. These outputs are combined at a summing point or conventional sum circuit 20. Any resultant signal signifies that the system gain is not optimum, as represented graphically by the low and high filter curves $K_2$, $K_3$ of FIGS. 15 and 16 and as explained hereinabove.

Figure 5:
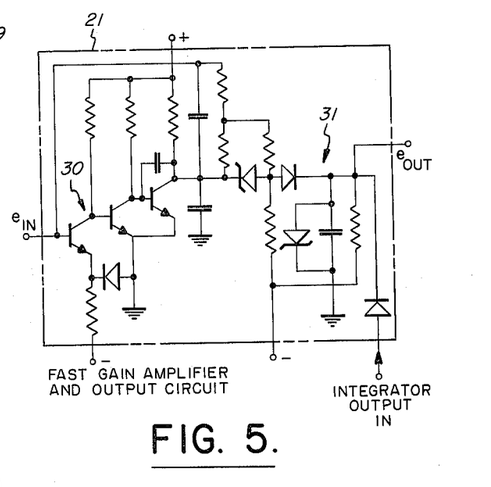

The output from the sum circuit 20 is connected to control the gain of the system variable gain control circuit 11 through two channels, a fast channel 21 and a slow channel 22. In accordance with a feature of the present invention, the fast channel 21 is adapted to have two different response characteristics depending on whether the input thereto is of one polarity or the other, i.e. whether the system gain is to be decreased or increased. As stated, since in normal operation the system gain is always set at its optimum value for all flight conditions, it is the function of the fast gain change loop 21 rapidly to drive the system gain downward should an oscillation develop. Also, it should drive the gain upwardly at a slow rate akin to "inching" toward a precarious position. It should be mentioned that the fast gain channel 21 has limited authority and operates over a narrower range than the slow gain channel 22. An example of a circuit for accomplishing this is shown in FIG. 5. It comprises basically an amplifier section 30 and a non-linear filter section 31. The filter section 31 is designed to pass substantially unattenuated a signal calling for a gain reduction but to attenuate or considerably reduce a signal calling for a gain increase. For the autopilot/aircraft system illustrated herein, typical responses may be of interest. Upon the detection of a high frequency error, the system gain may be reduced by a factor of 10 in about one second but with a low frequency error it may take about five seconds to raise the gain by a factor of 5. It will be understood by those skilled in the art that the desired responses may readily be obtained by judicious selection of the gain characteristic of amplifier 30 and the circuit elements of non-linear filter 31.

Figure 6:
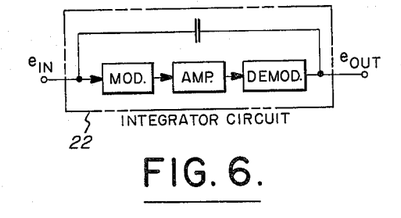

The slow gain change channel 22 is basically an integrator circuit and it provides gain change capability over a wider range than the fast gain channel 21. The integrator circuit 22 functions in the system to establish the steady-state gain setting for any flight condition and that around which the fast gain change circuit 21 operates. The characteristic of the integral circuit 22 is determined by desired rate of adaption which, of course, is determined by the characteristic of the over-all system. In the embodiment herein illustrated, it must be designed so as to be capable of maintaining an optimum system gain setting in face of rapidly changing flight conditions. An example of a circuit for providing the foregoing functions is shown in FIG. 6 and comprises a modulator-amplifier-demodulator having a series connected capacitance in a feedback connection which serves to provide the integral effect.

The outputs of the fast and slow gain changing circuits are combined in a conventional summing device 23, which as shown in FIG. 5, may be a summing point, and the resultant is supplied to the system variable gain control circuit 11. This variable gain element may take the form shown in FIG. 2, it being understood that any suitable gain changing circuit may be employed, such as a variable gain amplifier. In the circuit illustrated in FIG. 2, the output 15 of the adaptive computer 13 is applied to the lead labeled "gain control."

Figure 2:
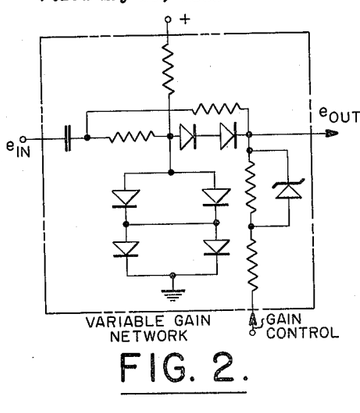
FIGS. 2 through 6 are diagrams of circuits which may be employed in certain of the functional blocks illustrated in FIG. 1.

In accordance with the objects of the present invention, there are provided two internal feedback connections in the self-adaptive computer 13 which, in effect, adapt the adaptive computer more accurately to changing operating conditions of the over-all system. The first minor feedback loop comprises a feedback connection from the output of one of the frequency responsive networks 16, 18 or 17, 19 to a variable gain network 25 responsive to the system error signal. This network 25 may be the same as the system variable gain control circuit 11, an example of which is shown in FIG. 2. In the illustrative embodiment, this feedback signal is derived from the output of the high frequency channel 17, 19 (selected on the basis of ease of filtering and minor loop stability considerations) and is fed back in a degenerative sense, that is, if the magnitude of the output of the channel 17, 19 increases, the output of the variable gain network 25 is decreased. In effect, this is an AGC which performs two important functions peculiar to the present adaptive computer. First, since the output of the computer is based on the difference between the energies associated with the high and low frequencies contained in the system error, it is important that this output be linear over the wide operating range of the system. This feedback 35 accomplishes this by preventing large system input signals from saturating the adaptive circuitry. Second, the feedback 35 normalizes the speed of response of the adaptive circuitry, making it possible to adapt at the same rate for small inputs as for large inputs. In terms of the illustrative example, the feedback 35 makes it possible for the adaptive computer to operate effectively when the aircraft is flying in quiet air and to operate without saturation occurring when the aircraft is flying in rough or turbulent air.

The second minor loop feedback comprises a feedback connection 36 between the output of the slow gain change amplifier integrator 22 and a variable gain element in one of the frequency responsive channels 16, 18 or 17, 19. The nature and reason for this feedback connection may be appreciated from a review of the curves shown in FIGS. 13, 14 and 16. In the disclosed embodiment, which these curves pertain to, at the low speed flight condition, the energy content of the high frequency spectrum of the system error is considerably reduced. This is due primarily to low control surface effectiveness, a sluggish aircraft, increased low frequency disturbances, etc. When, as shown in FIG. 14, the gain of the high frequency filter circuitry is increased, this reduction in the energy content of the high frequency spectrum of the system error at the low speed flight condition is effectively compensated. Thus a variable gain network 26 is inserted in the high frequency channel 17, 19 and its gain thus made dependent upon the average gain of the over-all system as controlled by the output of the slow gain change amplifier integrator 22. As intimated above, this feedback must be regenerative, that is, for low speed flight condition as the over-all system gain is increased to achieve the optimum, the high frequency channel gain is also increased. The advantages of this feedback loop are that (a) it serves to adapt the adaptive computer more accurately to the low speed flight conditions; (b) it compensates for the reduced high frequency energy at the low speed condition; (c) it insures that the over-all system gain will be reduced as swiftly as possible should a high frequency instability occur. It should be noted further that substantially the same results may be accomplished by placing the variable gain network 26 in the low frequency channel 16, 18 and controlling its gain from the integrator 22 output in a degenerative rather than a regenerative manner.

In the foregoing, we have set forth an energy balance self-adaptive system which has a wide variety of applications in the feedback control system art and a particular application to conventional aircraft and more exotic aerospace vehicles has been illustrated. The operation is based on maintaining a relative balance between the energies associated with vehicle dynamics and automatic pilot induced modes in the control error spectrum. The fact that this system looks at both the low and high frequency portions of the control error spectrum renders it capable of higher sensitivity to changes in vehicle dynamics than other systems that look only at high frequency errors.

The self-adaptive computer has a number of unique features which improve its performance and make it more adaptable to various applications. First, the circuit which controls the flight control gain is designed so that it will raise the gain slowly but drop the gain very swiftly should a high frequency instability occur due to an abrupt change in conditions. Second, an electronic integrator maintains the automatic pilot gain setting when undisturbed flight occurs. The integrator slowly drifts to a nominal gain setting which is consistent with stability at all flight conditions. Should air turbulence be experienced, or pilot commands be introduced, the adaptive system will rapidly adjust the gain level of the automatic pilot to the optimum level dictated by the flight condition at that time. Third, a feedback from the integrator controls the gain of the high frequency channel to modify the energy balance criterion as flight conditions change, as evidenced by the integrator output. This is set to weight the high frequency spectrum more heavily as integrator output increases. Fourth, while the gain setting accomplished by the adaptive system is unaffected by the level of commands and disturbances, the average signal levels and speed of adaptation could vary. To prevent this, an automatic gain control circuit is provided at the input to the self-adaptive system high and low frequency channels which keeps the signal levels and speed of adaptation essentially constant.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. A control system for controlling a condition to maintain a desired condition under a range of operating conditions affecting the response characteristics of said system and its ability to maintain said desired condition, said control system comprising
    (a) a source of error signal responsive to departures of said condition from said desired condition,
    (b) signal responsive means for controlling the condition of said system,
    (c) variable gain coupling means coupling said error signal with said signal responsive means in a sense to control said system to tend to minimize said error signal,
    (d) error signal responsive means connected to receive said error signal and responsive to the frequency spectrum of said error signal for measuring and supplying an output signal in accordance with the difference between the energy content of those portions of said error signal frequency spectrum in which an increase in the gain of the variable gain coupling means produces a decrease in energy and those portions of the frequency spectrum wherein an increase in the gain of the variable gain coupling means produces an increase in energy,
    (e) and means responsive to said output for varying the gain of said coupling means in accordance with accordance with said output signal.

2. A control system for controlling a condition to maintain a desired condition under a wide range of operating conditions affecting the response characteristics of said system comprising
    (a) a source of error signal variable at least in frequency in accordance with the frequency of departures of said condition from said desired condition,
    (b) signal responsive means for controlling the operation of said system,
    (c) variable gain coupling means coupling said signal source with said signal responsive means in a sense to cause said signal responsive means to control said system to tend to maintain said error signal zero,
    (d) frequency responsive means connected to receive said error signal and responsive to the spectrum of frequencies within the frequency response characteristics of said system for supplying an output representative of the difference between the energy content of the low and high frequencies contained in said error signal,
    (e) and means responsive to said output for varying the gain of said coupling menas in accordance with said difference signal and in a sense to minimize said difference through the control of said condition by said signal responsive means.

3. The apparatus set forth in claim 2 wherein said frequency responsive means comprises
    (a) a first frequency responsive circuit for supplying a first output representative of the energy content of the predominantly low frequency components of said signal,
    (b) a second frequency responsive circuit for supplying a second output signal representative of the energy content of the predominantly high frequency components of said error signal,
    (c) and means responsive to both said output signals for deriving a third signal in accordance with the difference between said first and second output signals.

4. Apparatus as set forth in claim 3 wherein said first circuit comprises a filter circuit adapted to pass the predominantly low frequencies of said signal, and rectifier means responsive to the passed frequencies for providing said first output, and wherein said second circuit comprises a filter circuit adapted to pass the predominantly high frequencies of said signal, and rectifier means responsive to the passed frequencies for providing said second output.

5. In a feedback control system for controlling a condition to maintain a desired condition under a range of operating conditions requiring a variation in system gain to maintain desired system response and the ability of the system to maintain a desired condition, said system including a source of error signal variable in accordance with departures of said condition from said desired condition, signal responsive means for controlling the condition of said system, and variable gain coupling means coupling said error signal with said signal responsive means in a sense to control said system to tend to minimize said error signal, wherein said last named means comprises, first and second means each responsive to said error signal for extracting therefrom first and second measures respectively representative of the energy content of the low and high frequency components contained within said error signal over a frequency spectrum corresponding substantially with the frequency response characteristics of said system, and means responsive to the difference between said first and second measures for controlling the gain of said variable gain coupling means in a sense to reduce said difference toward zero, whereby the gain of said system is varied over said range of operating conditions in a sense to maintain a balance between the high and low frequency energies contained in said error signal.

6. Apparatus for automatically adapting a feedback control system to varying operating conditions affecting the response characteristics of the system and its ability to maintain a desired condition, said system including a variable gain control means connected between the error input to the system and the controller thereof, the combination comprising
    (a) first and second means responsive to said system error input for deriving therefrom first and second outputs respectively representative of the energies contained in the low and high frequency components of said error input over the frequency spectrum of said system response range,
    (b) means combining said outputs for supplying a third output representative of the magnitude and sense of the difference therebetween, and
    (c) means coupling said third output with said system gain control means for varying said system gain in a sense to tend to maintain said third output zero.

7. Apparatus set forth in claim 6 wherein said coupling means comprises a gain control means responsive to said third output for changing the gain of said system in one direction more rapidly than in the other depending on the sense of said third output.

8. Apparatus as set forth in claim 6 wherein said coupling means comprises a gain control means for decreasing the gain of said system more rapidly for a predominance of said second output over said first output than for predominance of said first output over said second output.

9. Apparatus as set forth in claim 6 wherein said coupling means comprises
   (a) a first gain control circuit responsive to said third output for changing the gain of said system in one direction more rapidly than in the other depending on the sense of said third output, and
   (b) a second gain control circuit responsive to said third output and including integrating means for establishing a steady state gain setting for said system gain control means.

10. Apparatus for automatically adapting a feedback control system to varying operating conditions affecting the response characteristics of the system and its ability to maintain a desired condition, said system including a variable gain control means connected between the error input to the system and the controller, the combination comprising
   (a) first and second means responsive to said system error input for deriving therefrom first and second outputs respectively representative of the energies contained in the low and high frequency components of said error input over the frequency spectrum of said system response range,
   (b) variable gain control means responsive to said error input and coupling said error input with said first and second means,
   (c) means responsive to the magnitude of one of said first and second outputs for controlling the gain of said variable gain control means in accordance therewith, whereby to render said first and second means substantially insensitive to the average level of said error input,
   (d) means combining said first and second outputs for supplying a third output representative of the magnitude and sense of the difference between the low and high frequency energies in said error input, and
   (e) means coupling a said third output with said system gain control means for varying said system gain in a sense to tend to maintain said third output zero.

11. Apparatus as set forth in claim 10 wherein said coupling means includes integrating means for establishing a steady state gain setting for said system gain control means, and wherein one of said first means includes means for varying the magnitude of its output, and feedback means responsive to the output of said integrating means for controlling the setting of said last-mentioned means whereby to vary the sensitivity of said apparatus to one of said low and high frequency energies in said error input.

12. Apparatus as set forth in claim 11 wherein said coupling means further includes circuit means responsive to said third output for varying the rate at which said system gain is changed in accordance with the sense of said third output.

13. In an automatic control system for aircraft having signal responsive means for moving said craft about an axis thereof, means for detecting and providing a system error signal variable in accordance with movements of said craft about said axis, and system variable gain control means coupling said signal with said signal responsive means, the combination comprising
   (a) error responsive means including first and second channels respectively responsive to the low and high frequencies contained in said error signal over the frequency spectrum of the response characteristics of said system and aircraft and adapted to derive therefrom first and second signals, the amplitudes and sense thereof being respectively representative of the low and high frequency energies contained in said frequency spectrum,
   (b) variable gain means for coupling said system error signal with said error responsive means,
   (c) means responsive to said first and second for supplying a third signal having a magnitude and sense representative of the difference therebetween,
   (d) first system gain control means responsive to said third signal for supplying a first gain control signal and being so constructed and arranged that it will change the gain of said system variable gain control means more rapidly for one sense of said third signal than the other sense thereof,
   (e) second system gain control means responsive to the third signal for supplying a second gain control signal and being so constructed and arranged that it will establish a steady state gain setting for said system variable gain control means,
   (f) a first feedback circuit connecting one of said first and second signals with said variable gain coupling means for maintaining said error responsive means within its operating range for large values of said system error signal and,
   (g) a second feedback circuit connecting said second system gain control signal with one of said first and second channels for varying the magnitude of one of said first and second signals with respect to the other in accordance with the steady state setting of said system gain control means.

References Cited by the Examiner
UNITED STATES PATENTS
3,079,108   2/63   Falkner _______________ 244—77

FERGUS S. MIDDLETON, *Primary Examiner.*

RALPH D. BLAKESLEE, MILTON BUCHLER,
*Examiners.*